United States Patent [19]

Hailpern et al.

[11] Patent Number: 4,881,164

[45] Date of Patent: Nov. 14, 1989

[54] MULTI-MICROPROCESSOR FOR CONTROLLING SHARED MEMORY

[75] Inventors: Brent T. Hailpern, Katonah; Lee W. Hoevel, Yorktown Heights, both of N.Y.; Eugene Shapiro, Stamford, Conn.

[73] Assignee: International Business Machines Corporation, Armonk, N.Y.

[21] Appl. No.: 51,178

[22] Filed: May 18, 1987

Related U.S. Application Data

[63] Continuation of Ser. No. 567,304, Dec. 30, 1983, abandoned.

[51] Int. Cl.⁴ .............................................. G06F 13/14
[52] U.S. Cl. .................................................. 364/200
[58] Field of Search ................................ 364/200, 900

[56] References Cited

U.S. PATENT DOCUMENTS

| | | | |
|---|---|---|---|
| 3,735,360 | 5/1973 | Anderson | 364/200 |
| 3,845,474 | 10/1974 | Lange | 364/200 |
| 3,919,693 | 11/1975 | Anderson | 364/200 |
| 4,056,844 | 11/1977 | Izumi | 364/200 |
| 4,070,706 | 1/1978 | Scheuneman | 364/200 |
| 4,084,230 | 4/1978 | Matick | 364/200 |
| 4,174,514 | 11/1979 | Sternberg | 364/200 |
| 4,228,496 | 10/1986 | Katzman | 364/200 |
| 4,253,144 | 2/1981 | Bellamy et al. | 364/200 |
| 4,365,292 | 12/1982 | Barnes et al. | 364/200 |
| 4,394,731 | 7/1983 | Flusche et al. | 364/200 |
| 4,394,733 | 7/1983 | Swenson | 364/200 |
| 4,442,487 | 4/1984 | Fletcher et al. | 364/200 |
| 4,471,429 | 9/1984 | Porter et al. | 364/200 |

FOREIGN PATENT DOCUMENTS 0061585  10/1982  European Pat. Off. .

Primary Examiner—David Y. Eng
Attorney, Agent, or Firm—Sughrue, Mion, Zinn, Macpeak, and Seas

[57] ABSTRACT

In a data processing system including a relatively large, page-formatted memory, memory control functions are distributed over a plurality of microprocessors connected in an array with each microprocessor controlling a respective area of the large memory. Upon overflow of its assigned memory area, a microprocessor may "borrow" free memory space assigned to one of its neighbors in the microprocessor array. Memory control functions with respect to different areas in the memory can effectively be performed in parallel, thus improving the operating efficiency.

25 Claims, 3 Drawing Sheets

Pi : i-th ARRAY MICROPROCESSOR
Ni, Ei, Wi, Si : NEIGHBORING ARRAY MICROPROCESSORS
Mk : DUAL-PORTED LOCAL MEMORY DEDICATED TO ARRAY MICROPROCESSOR K

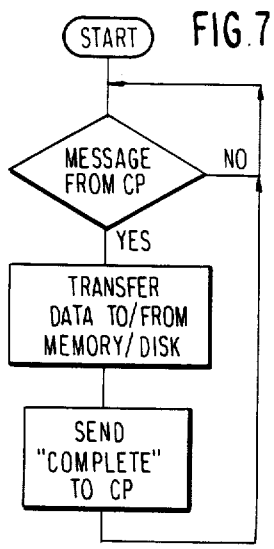
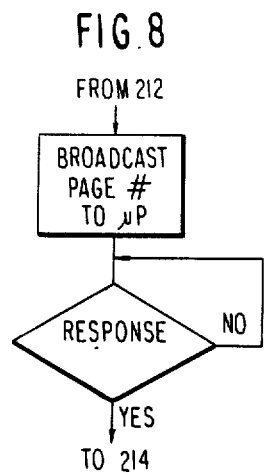
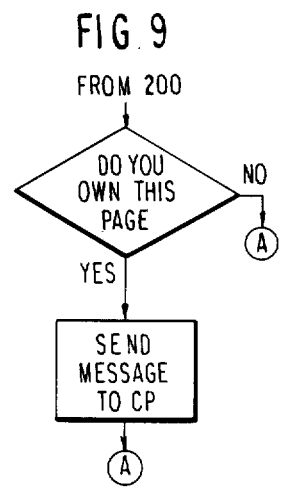
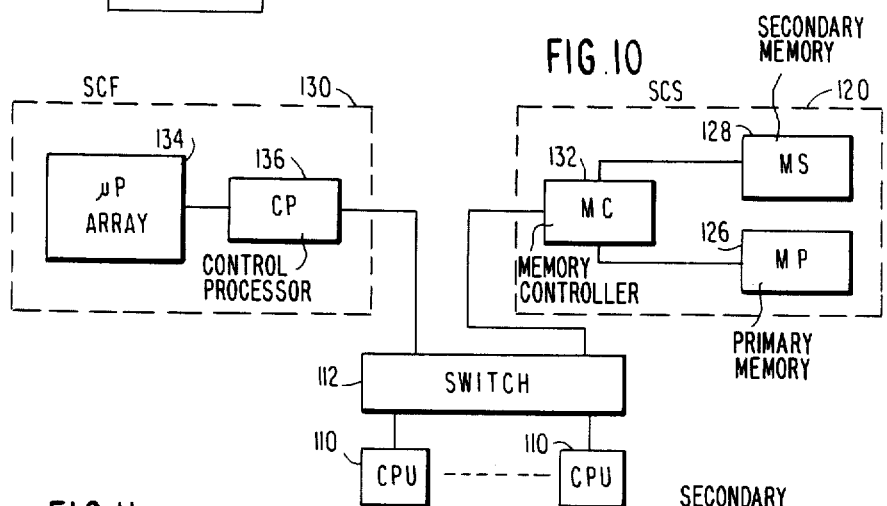
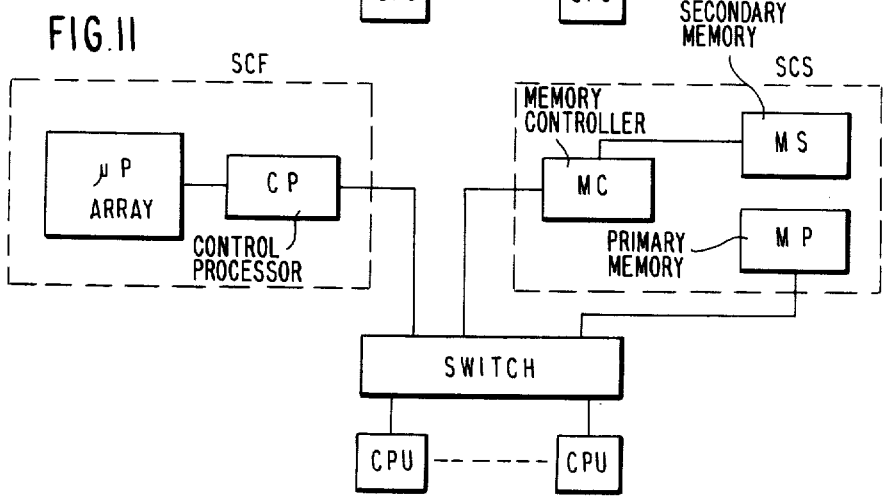

MULTI-MICROPROCESSOR FOR CONTROLLING SHARED MEMORY

This is a Continuation of application Ser. No. 567,304 filed December 30, 1983, and now abandoned.

BACKGROUND OF THE INVENTION

The present invention is directed to multi-station data processing systems, and more particularly to systems wherein multiple intelligent terminals share a large common memory.

In multi-processor systems employing a large common memory, a single sequential-type controller is typically used, such as a high speed 370 (e.g., a 3081) processor. The shared common memory may, e.g., include a primary memory (typically a random access memory) and a backing store (e.g., a disc). When a request for data is received, the processor must search the contents of the primary memory to determine if the requested record has been stored and, if not, request a data transfer from the backing store to the primary memory. When a plurality of data requests are received from different terminals, the sequential controller must process each request in sequence, and the system must therefore either use a very high speed processor, resulting in substantial cost increase, or use a less expensive and lower speed processor, resulting in unsatisfactory delays in memory access.

There is a need, then, for a memory control system which is both efficient and inexpensive.

SUMMARY OF THE INVENTION

It is therefore an object of the present invention to provide a shared memory system which is inexpensive to implement and is yet highly efficient in operation.

It is a feature of this invention that a high-speed sequential memory controller is not required in order to obtain satisfactory access times even during a high volume of operations.

Briefly, in accordance with the present invention, the shared memory may comprise a large, page-formatted memory divided into a plurality of areas. The memory control function is distributed across an array of dedicated microprocessors, each of which is assigned to a specific area of the shared memory. Each microprocessor maintains the status of its assigned area in its own local storage, and can thus respond faster and with less variation in response time than a more powerful and more expensive serial controller which would have to manage the entire shared storage. In a preferred embodiment, the storage control function is achieved by a microprocessor array and a control processor. Upon receiving a request for data from one of the terminals in the system, the control processor will hash the requested virtual address to determine which of the microprocessors, if any, in the array, would be storing the requested data. The control processor then forwards the data request to that microprocessor which examines a directory table maintained in its own internal memory to determine if the requested data is currently stored in the portion of the shared primary memory which has been assigned to that microprocessor. If so, the address of the requested data in the primary memory is sent back to the requesting terminal, and the requesting terminal can then access the shared primary memory directly to obtain the desired data.

If the microprocessor determines that the requested data is not in its assigned primary memory area, a command is sent to a memory controller to transfer the requested record from a backing store, e.g., a disc memory, to the primary memory and, upon completion of the transfer, the microprocessor then sends the new address of the requested data to the requesting terminal.

If the microprocessor responsible for the requested data finds that the requested data is not presently stored in its assigned primary memory area but that there is insufficient free space in its assigned memory area to accommodate a transfer of the requested data from the disc, the microprocessor can either discard some of its current data, e.g., in accordance with a Least Recently Used (LRU) algorithm, or it can negotiate with neighboring microprocessors to "borrow" some of the shared memory space assigned to its neighbors.

In an alternative arrangement, the control processor which is part of the storage control function need not maintain a hashing table for determining which of the microprocessors in the array is responsible for a requested data, but instead the control processor can merely broadcast the data request to all microprocessors in the array. All microprocessors can then examine their directory tables to determine if they currently control the requested data, and an appropriate one of the microprocessors will send an acknowledgement back to the control processor to indicate that it does control the requested data and will subsequently send the primary memory address of the requested data back to the requesting terminal. If no microprocessor responds affirmatively to the data request broadcast, the control processor can then broadcast to all microprocessors a request for free space. Any microprocessor having available memory in the shared primary storage will inform the control processor, at which time the control processor will then select one of the microprocessors according to a suitable algorithm and assign control of the requested data to that microprocessor for storage in its assigned memory.

The foregoing and other objects, features and advantages of the invention will be apparent from the following detailed description of the invention in conjunction with the accompanying drawings, wherein:

BRIEF DESCRIPTION OF THE DRAWINGS

FIG. 7 is a flow chart illustrating the essential aspects of operation of the memory controller in FIG. 3;

FIG. 8 is a flow chart portion illustrating changes in the operation illustrated in FIG. 5 for broadcast mode operation;

FIG. 9 is a flow chart portion illustrating changes in the operation illustrated in FIGS. 6A and 6B for broadcast mode operation; and FIGS. 10 and 11 illustrate alternative arrangements to that illustrated in FIG. 3.

DETAILED DESCRIPTION OF THE PREFERRED EMBODIMENTS

Figure 1:
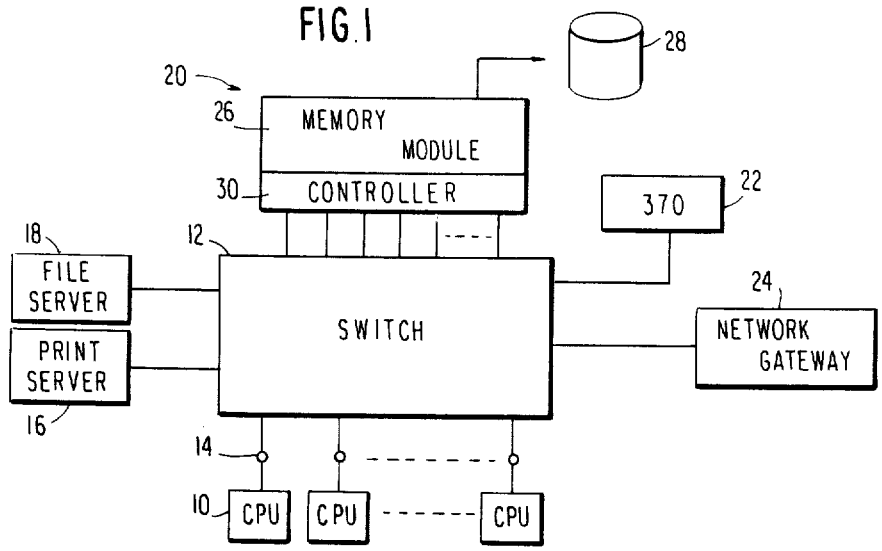
FIG. 1 is a block diagram of a system in which the memory system according to the present invention may be employed.

From the description which follows, it will be clear that the memory arrangement according to the present invention will have a wide range of possible applications. However, FIG. 1 is a general diagram of a data processing system in which use of the memory control system according to the present invention is contemplated. In the system of FIG. 1, a plurality of intelligent terminals 10 are connected to respective ports of a switch 12. Each of the terminals 10 may be, e.g., a personal computer such as an IBM PC. As illustrated in FIG. 1, the terminals 10 are each coupled to the switch 12 through a respective mapping box 14 which is provided solely for purposes of address translation.

A variety of devices and circuits may be connected to respective ports of the switch 12, e.g., a print server 16, file server 18, memory 20, shared mainframe 22, etc. One of the ports of the switch 12 may also be coupled to a network gateway generally illustrated by block 24.

The switch 12 is preferably a non-blocking type switch which can operate to selectively connect any of its ports to one another. In this way, any one of the cluster of intelligent terminals 10 illustrated in FIG. 1 may have access to the print server 16, the file server 18 or some other type of shared intelligence 22, e.g., an IBM 370 mainframe computer. Any of the terminals may also communicate with one another through the switch. Terminals which require frequent communications with one another or with a peripheral unit connected to the switch 12 will be connected to the switch as shown in FIG. 1. If less frequent communications are desired with other terminals, such communications may be established through the network gateway 24 which may, e.g., be a connection to a local area network or may even be a connection to a second switch to which a further cluster of terminals are connected as shown in FIG. 1.

The details of operation of the overall system are set forth more particularly in a concurrently filed and commonly assigned application entitled Local Area Network Interconnect Switching System identified by Assignee Docket No. YO 9-82-058, the disclosure of which is incorporated herein by reference. It should again be emphasized, however, that the system illustrated generally in FIG. 1 of the present application and described in more detail in said copending application is but one example of an application of the memory system according to the present invention.

The present invention concerns the design and operation of the memory, generally designated by reference numeral 20, which may include a primary memory, e.g., a random access memory (RAM) 26, a backing store 28, e.g., a disc storage device, and a controller 30. The primary memory 26 may be a large, page-formatted or segmented memory. As described above, the problem addressed by the present invention is the economical and effective control of this memory. A conventional system would use a fast serial machine to implement the needed control functions, using memory maps and/or hashing tables. In fact, this function is often performed by one or all of the intelligent terminals 10 using local tables that describe the status of the various pages in the shared memory. The present invention, rather than using a single fast serial machine, uses a plurality of microprocessors to implement the required memory control, as will now be described in more detail with reference to FIGS. 2-7.

Figure 2:
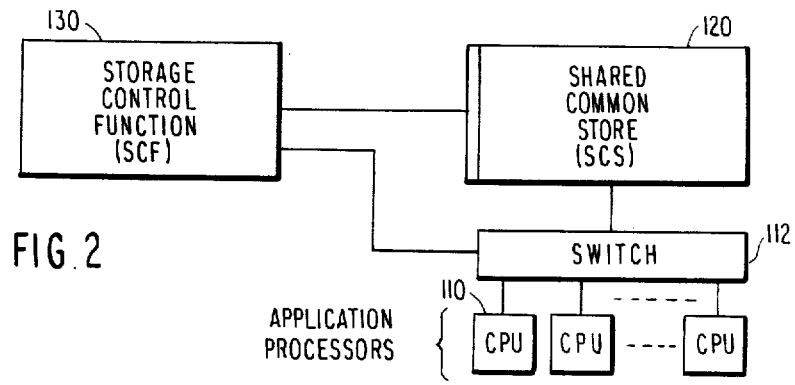
FIG. 2 is a brief block diagram of the essential components of the invention together with those components of the system of FIG. 1 necessary for a description of the invention.

FIG. 2 generally illustrates one arrangement of the multi-microprocessor system for controlling shared memory. The application processors (CPUs) 110 in FIG. 2 correspond to the intelligent terminals 10 in FIG. 1, the switch 112 in FIG. 2 generally corresponds to the non-blocking switch 12 in FIG. 1, the Shared Common Store (SCS) 120 corresponds to the primary memory 26 and secondary memory 28 in FIG. 1, and the Storage Control Function (SCF) 130 generally corresponds to the memory controller 30 illustrated in FIG. 1. The SCF 130 would perform various memory control functions, e.g., maintaining a directory table of the contents of the shared memory, issuing commands for memory transfers, etc.

Figure 3:
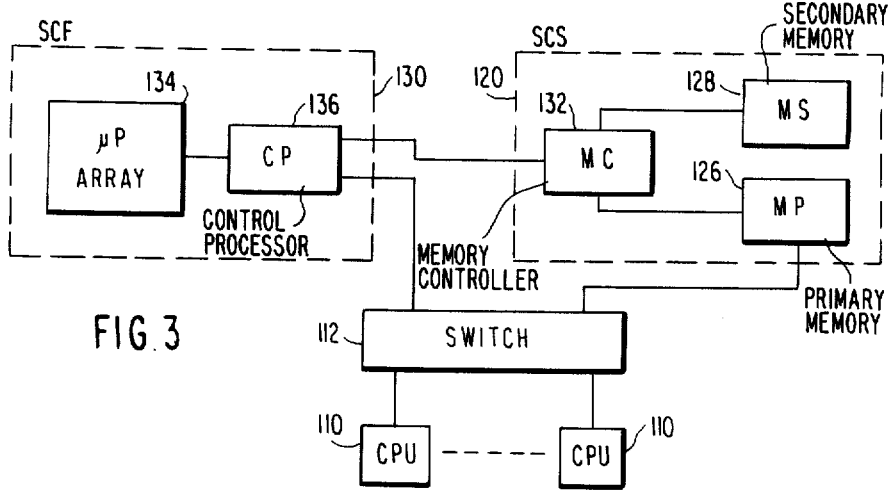
FIG. 3 is a block diagram illustrating in more detail the memory system of FIG. 2.

A preferred arrangement for the multi-microprocessor memory control system may be as illustrated in more detail in FIG. 3. As shown, therein, the Shared Common Store 120 can include both a primary memory $M_P$ 126 and a secondary memory $M_S$ 128. A conventional smart memory controller MC 132 can control data transfers between the primary and secondary memories while maintaining communication with the SCF 130.

The SCF 130 can include a microprocessor array 134 and a control processor 136. The microprocessor array may be, e.g., an array of Z80 microprocessors available from Zilog or a plurality of 8086 microprocessors available from Intel. The control processor 136 could be an 8086 microprocessor. It should be appreciated that other microprocessors could be used as well.

Figure 4A:
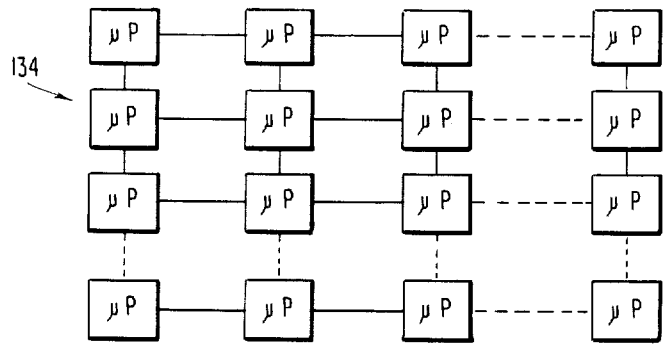
FIGS. 4A and 4B are a schematic illustration of the matrix of microprocessors for memory control as contemplated in the preferred embodiment of the present invention.
Figure 4B:
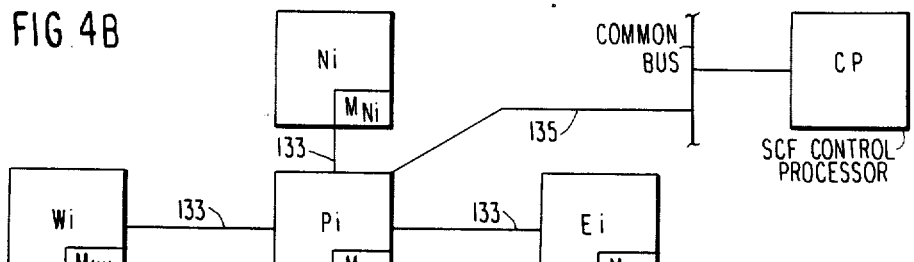

In the preferred embodiment, the primary memory 126 will be a large, page-formatted memory divided into a plurality of portions, and each of the microprocessors in the array 134 will be assigned to a respective portion, or area, in the primary memory 126. The plurality of microprocessors in the array 134 may be connected substantially as disclosed in copending patent application Ser. No. 272,880, filed June 12, 1981, the disclosure of which is incorporated by reference herein. In general, the microprocessors may be arranged as shown in FIGS. 4A and 4B. Each of the processors is connected via communications ports or channels 133 to each of its four immediate neighbors, and all microprocessors will also be connected to a common bus 135 for communicating with the control processor 136. Each microprocessor will include dual-ported local memory, e.g., with one R/W port and one RO port, or two R/W ports with a bus arbitrator. This will be described in more detail below.

In any event, each microprocessor in the array 134 maintains in its own local storage the status, or a directory table, of its assigned area and can respond faster and more consistently than a more powerful serial controller which would have to manage the entire shared storage. Any request by a particular terminal 110 for a data record would be forwarded to the microprocessor array 134 which would then send back to the requesting terminal the address in the primary memory 126 at which the requested record could be found. The terminal 110 could then access the primary memory 126 directly through the switch 112. If the requested data record was not presently in the memory 126, a command would be sent from the microprocessor array 134 to the memory controller 132 to cause the memory controller 132 to transfer the requested record from the backing store 128 to the main memory 126. A signal indicating that the transfer had been completed would then be sent back to the microprocessor array, and the address of the requested record in the memory 126 would then be sent to the terminal 110.

Figure 5:
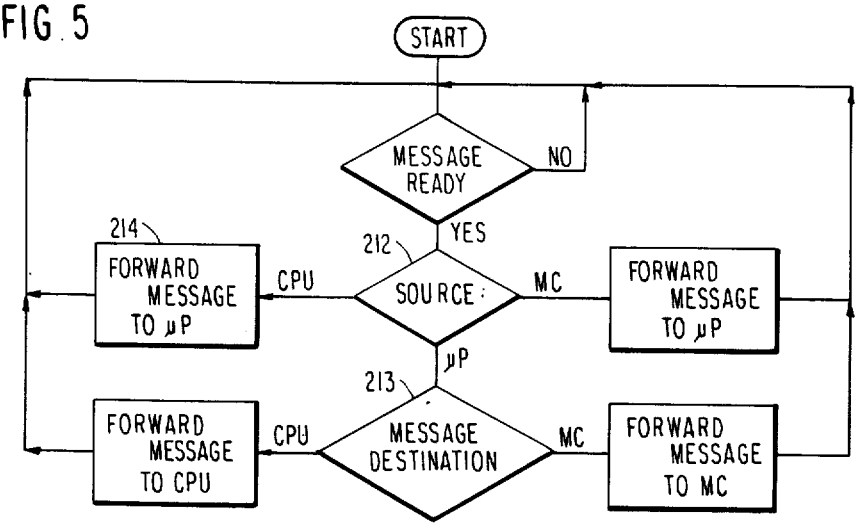
FIG. 5 is a flow chart illustrating the essential aspects of the operation of the control processor in FIG. 3.

The operation of the multi-microprocessor shared memory control system can be more clearly understood with reference to the flow charts of FIGS. 5–7. First, as shown in FIG. 5, the control processor 136 in the preferred embodiment of this invention acts essentially as an interface forwarding messages between the switch 112, microprocessor array 134 and memory controller 32. Messages from the memory controller 132 or switch 112 are forwarded to the microprocessor array 134, and messages from the microprocessor array 134 are forwarded to the switch 112 or memory controller 132 as appropriate.

Figure 6A:
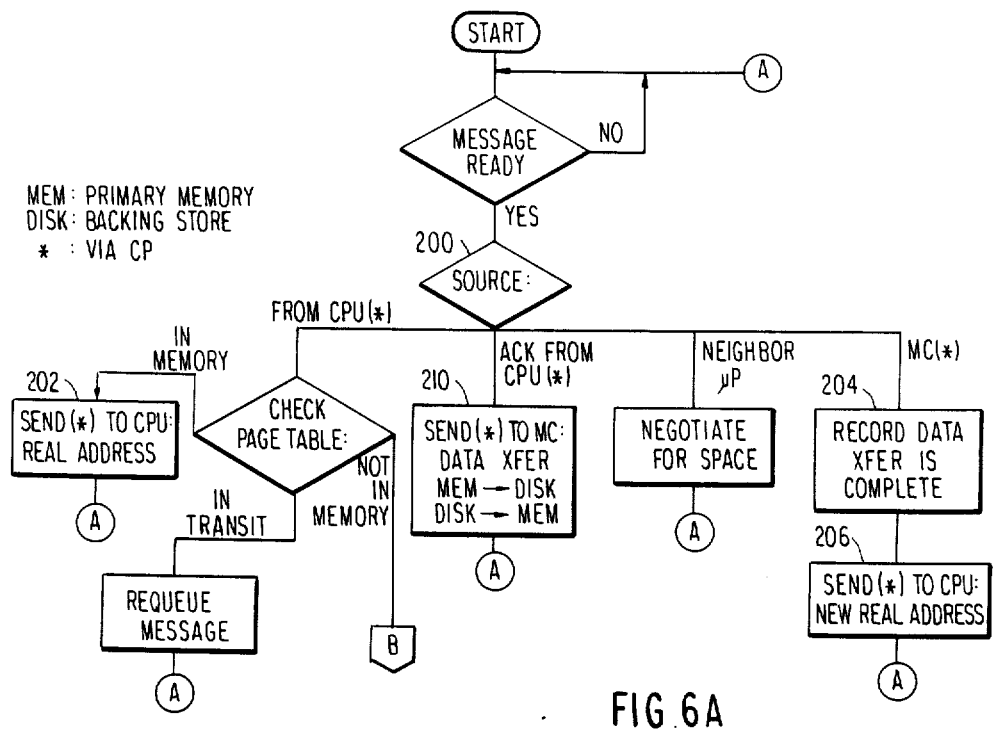
FIGS. 6A and 6B together form a flow chart of the essential aspects of the operation of individual microprocessors in the microprocessor array of FIG. 3.
Figure 6B:
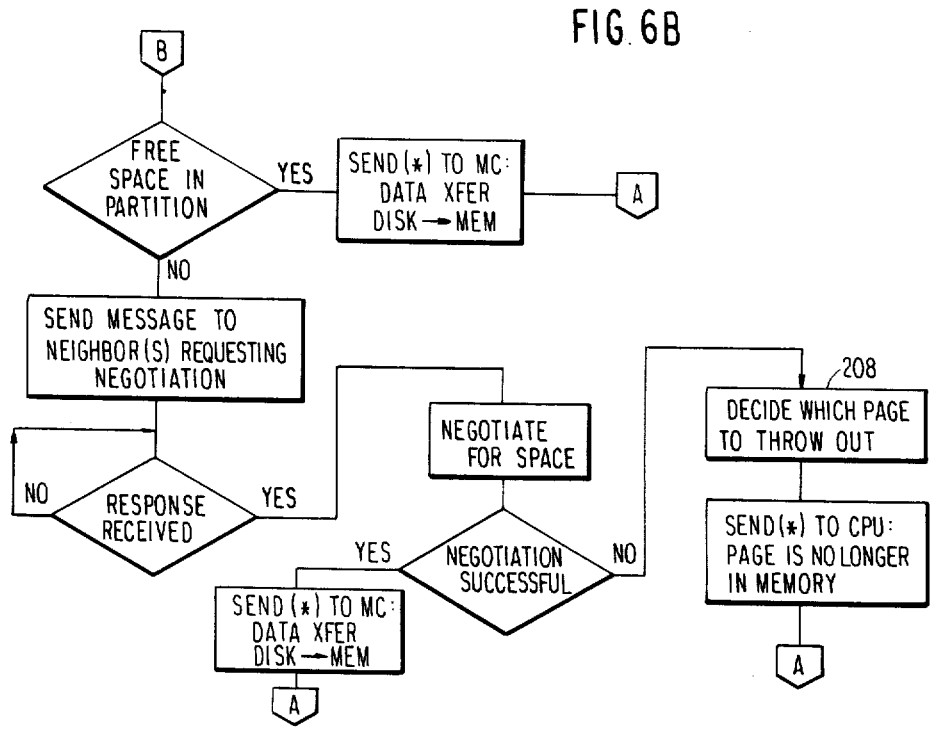

Referring now to FIG. 6A, the operation of the microprocessor array 134 will now be described in more detail. When one of the terminals 110 requests a particular record of data, the data request is connected through the switch 112 to the control processor 136 which then forwards the request to a specific microprocessor in the array 134 by hashing the requested address. The particular microprocessor to which the request is forwarded will determine at step 200 in FIG. 6A that the received message is a request for data by a terminal, and the microprocessor will check its page table to find out if the requested record is stored in the area of memory which has been assigned to that microprocessor. Assuming that the requested record is already in the memory 126, the microprocessor at step 202 sends back to the requesting terminal, via the control processor 136 and switch 112, the address in the memory 126 at which the requested data can be found. The terminal 110 can then access the memory 126 directly through the switch 112.

If the requested data is not listed in the page table, the microprocessor will determine if there is sufficient free space in its partition, i.e., in the area of the memory 126 assigned to that microprocessor, to store the requested record. If so, the microprocessor sends a command to the memory controller 132 to transfer the data from the backing store 128 to a particular address in the primary memory 126. The microprocessor then returns to the beginning of the program in FIG. 6A. As soon as the data transfer has been completed by the memory controller 132, a signal to that effect is sent via the control processor 136 to the appropriate microprocessor which then determines at step 204 that the data transfer has been completed. The address of the requested data in the memory 126 is then sent to the requesting terminal.

If the requested data record is not currently in the memory 126 but the microprocessor determines at step 206 that there is insufficient free space in its assigned memory partition to store the requested record, it must either transfer some of its current memory content to the backing store in order to make room for the newly requested record, or it must obtain the use of some additional memory space. In most cases the latter option is preferred, and the microprocessor at step 208 sends a request over the common communication channels 133 to its immediate neighbors requesting negotiation. When a response is received from a neighbor, the microprocessor then negotiates with that neighbor to determine if the neighboring microprocessor has any space in its own assigned memory partition that it would be willing to relinquish. If the free space in the assigned memory partition of the current microprocessor, together with all of the free space which it may be able to obtain from its neighbors, totals a sufficient amount of memory to accommodate the transfer of the requested record from the backing store, the space negotiation is considered successful and the microprocessor sends to the memory controller 132 a request to transfer the requested data from the backing store to the memory 126. The microprocessor then returns to the beginning of the program in FIG. 6A and again awaits a signal from the memory controller indicating that the data transfer has been completed.

If the negotiation for space is unsuccessful, the microprocessor must discard some of its current memory content in order to make room for the newly requested data record. At step 208 in FIG. 6B, the microprocessor determines which page should be discarded, and this can be done according to any one of a number of known criteria, e.g., according to a Least Recently Used (LRU) algorithm. The microprocessor cannot merely dump a page from its memory partition, since the terminal which last requested that page may currently be accessing the page directly through the switch 112. Accordingly, when the microprocessor determines that a page should be discarded, it sends a signal to the terminal last requesting that page to indicate that the page is no longer in memory. The microprocessor then returns to the beginning of the program in FIG. 6A and awaits acknowledgement from the terminal. As soon as an acknowledgement is received, the microprocessor program advances to step 210 in FIG. 6A and sends a data transfer command to the memory controller to cause the discarded data to be written out to the backing store 128 and the newly requested data to be written from the backing store 128 to the appropriate address locations in the memory 126. The microprocessor then returns to the beginning of the program to await a signal from the memory controller that the data transfer has been completed, at which time the new address location of the requested data is forwarded via the control processor 136 and switch 112 to the requesting terminal 110.

The function of the controller 132 is merely to process data transfer requests and to send completion signals back to the control processor 136. This is generally illustrated in the flow chart of FIG. 7. The memory controller may be a conventional smart disc controller, and its detailed operation will be well understood to those of skill in the art.

As described above, the preferred operation of the control processor 136 is to hash the data address in order to determine particular microprocessor in the array 134 which should control that record. However, if hashing is not practical, then a broadcast algorithm can be used.

This broadcast type of operation would follow essentially the same process set forth in the flow charts of FIGS. 5–7, with the following changes. First, with regard to the operation of the control processor shown in FIG. 5, having determined at step 212 that the source of an incoming message is one of the terminals 110, the control processor will not know which of the microprocessors in the array 134 must receive the message.

Accordingly, between the steps 212 and 214 in FIG. 5, the control processor will perform the additional steps of broadcasting the requested page number via the common bus to all microprocessors and then awaiting a response from a particular microprocessor indicating that it controls that page number. With regard to the operation of individual microprocessors illustrated in FIGS. 6A and 6B, each microprocessor at step 200 will also be capable of detecting when a message is a broadcast page number requiring a response. In response to the broadcast page number, the microprocessor will test to see if it does control that page and, if so, will send back a response to the control processor indicating that it does control that page. The control processor, receiving a response indicating that a particular microprocessor controls the requested page, will then forward the message to that microprocessor at step 214 in FIG. 5. The additional steps in the control processor flow chart for broadcast operation are shown in FIG. 8, and the additional steps to be added to the microprocessor flow chart of FIG. 6A for broadcast operation are illustrated in FIG. 9.

It should be noted that an alternative technique for broadcast operation would be for the control processor, after broadcasting the page number to all microprocessors as shown in the flow chart portion of FIG. 8, to return to the beginning of the control processor program in FIG. 5 and await an acknowledgement message from the responsible microprocessor. When an acknowledgement is received and is detected at step 212 in FIG. 5 as being from a microprocessor, a third destination choice branching from step 213 in FIG. 5 would be that the message is from a microprocessor and is directed to the control processor as an acknowledgement of page responsibility. After determining the identity of the acknowledging microprocessor, the control processor could then forward the data request message to the acknowledging microprocessor. Such a technique, however, may result in excessive delays in processing data requests, and it would normally be preferable to place a higher priority on the determination of the responsible microprocessor by having the control processor wait for an immediate response as represented in FIG. 8. It would also be preferable to have each of the microprocessors in the array, upon detecting a broadcast page number from the control processor, to recognize the priority and to either respond immediately or to refrain from using the common bus for other signalling until some other microprocessor has responded.

In the broadcast-type system, when no response is received from any microprocessor indicating that it controls the requested page, the control processor knows that a new page is needed. In such a case, the controller will broadcast a request for a new page to all of the elements in the microprocessor array. All elements that have free pages available will respond with their identification numbers on a common bus. In a case of multiple free pages, the controller would use a suitable minimum finding algorithm for selecting one of the free pages. If only one copy of a page exists in memory at a time, the controller can broadcast the request for access to that page knowing that only the proper array element will respond. Duplicate copies of a page and/or data and code sharing (synonym problem) can also be handled using this technique.

Once responsibility is assigned to a particular microprocessor in the array 134, that microprocessor will retain responsibility for that page until the requesting terminal 110 indicates that the page is no longer needed. Until that time, all requests for that page will be acknowledged by the responsible microprocessor. If the microprocessor finds it necessary to write that page out to the backing store 128 before the terminal 110 originally requesting the data has indicated that the data is no longer needed, the microprocessor will notify the originally requesting terminal before writing the data out to the backing store 128, just as in the hashing embodiment described above. In response to a subsequent request for the same data, the same microprocessor will acknowledge responsibility for the page and will then request the memory controller 132 to transfer the page from the backing store 128 to the primary memory 126, again in a manner substantially the same as described above with reference to the hashing embodiment.

If a microprocessor in the array 134 has accepted responsibility for a data page but has written the data out to the backing store 128, the microprocessor may receive a subsequent request for that data at a time when it does not have sufficient space in its assigned area of the primary memory 126. In such a case, the microprocessor will either borrow some memory space assigned to one of its neighbors or will discard some of the data currently stored in its assigned primary, memory area in order to make room for the newly requested data. Both of these procedures will be performed in substantially the same manner as described above with reference to the hashing embodiment of the invention.

The hashing mode of operation, i.e. the embodiment of the present invention wherein the control processor 136 would hash the requested data address in order to determine the responsible microprocessor in the array 134, would normally be more efficient than the broadcast mode, but the broadcast mode of operation would be advantageous in that it would permit more efficient balancing of the loading of individual microprocessors in the array 134. This can be understood by examining the two techniques more closely. With reference first to the hashing technique, each microprocessor in the array 134 would be assigned responsibility not only for a respective area of the primary memory 126 but also for a respective area of the virtual address space. At each data request, the virtual address would be hashed to determine the responsible microprocessor, and each time a particular record of data is requested it would always be considered the responsibility of the same microprocessor. The responsible microprocessor would therefore always be determined quickly, and the hashing mode of operation would be more efficient in this regard.

In the broadcast mode of operation, a data request would be broadcast to all microprocessors in the array 134, and the responsible microprocessor would acknowledge. If no microprocessor acknowledged responsibility, the control processor would then have to ask for free page availability and would then have to assign responsibility to an appropriate one of the responding microprocessors. This would be a somewhat slower technique for determining the responsibility for a requested page, but the load balancing advantages should be easily appreciated. More particularly, rather than requiring that the same microprocessor always have responsibility for a particular page as in the hashing technique, the broadcast technique would permit assignment of responsibility to any microprocessor in the array in accordance with the loading of the microprocessors at the time of the original request.

The loading balancing feature of the broadcast mode of operation would be useful not only in assigning responsibility for new pages, but could be utilized on a continuing basis as follows. If a first microprocessor finds that its directory table, or list, is becoming undesirably long, the first microprocessor may communicate with one of its neighbors to see if a neighbor will accept responsibility for one of the pages for which the first microprocessor is currently responsible. If a neighboring microprocessor does not have an excessively long list, it may accept responsibility for one or more data pages, and the neighboring microprocessor will then acknowledge responsibility for that page upon all future requests. This type of ongoing load balancing operation is possible in the broadcast mode wherein responsibility for virtual address space is not fixed for each microprocessor, but it would not be possible in the hashing mode of operation. Rather than delegating responsibility for some of its pages, an overloaded microprocessor in the hashing mode of operation can only seek to obtain additional memory space from its neighbors.

In the broadcast type of operation, no interconnection of the microprocessors would be strictly necessary, since processors could communicate over the common bus. It would be more efficient, however, to provide the communications channels between neighboring microprocessors to permit load balancing and borrowing of assigned primary memory space, as described above. Further, it may also be advantageous to provide each microprocessor with dual-ported internal memory and to permit each microprocessor to monitor the page table and its adjacent microprocessors.

This would provide back-up protection in the case of the microprocessor failure. For example, if a page number were broadcast to all microprocessors and no response was received, the control processor could send out a request asking that all microprocessors examine the page tables in their neighbor microprocessors to insure that a microprocessor had not failed and was merely failing to respond.

In the arrangement described above, the intelligent disc controller MC will be physically located within the Shared Common Store, since there are several configurations in which the application CPU's must communicate with the main memory 126 through the controller 132. In the preferred embodiment shown in FIG. 3, the primary memory MP is dual-ported to provide direct access by the application CPUs 110 to the memory 126 through the switch 112. Alternative arrangements may be used, however, several examples of which are illustrated in FIGS. 10-13.

In FIG. 10, there is no direct connection between the control processor 136 and memory controller 132, and there is also no direct connection from the switch 112 to the primary memory 126. Such a configuration will be less expensive to implement than that illustrated in FIG. 3, but will not be capable of operating as efficiently at high volume, since all signalling between the control processor 136 and the memory controller 132 must pass through the switch 112.

The implementation illustrated in FIG. 11 would in most instances be even slower than that of FIG. 10, since all memory transfers between the backing store 128 and the primary memory 126 would also have to be passed through the switch 112. Other variations in the system architecture will be easily apparent to those skilled in the art.

With the operation as described above, the management of the memory 126 is shared by a plurality of microprocessors. The memory 126 can therefore be made quite large without encountering excessive memory access delays which would result if a single memory controller were used which would have to process all data requests in a serial manner and which would be required to manage the entire shared storage by itself. For example, consider the synonym problem for a controller with 64 independent element microprocessors. The memory system would be presented with a virtual address and would have to determine whether any page currently in the shared storage has been mapped onto this virtual address, even though it may have been brought in under some other identifier. The system according to the present invention divides the total number of pages in the shared memory into 64 roughly equal sets, and each set would be examined independently and concurrently by its own dedicated microprocessor. A sequential-processor based controller would have to be 64 times as fast as one microprocessor element of the present invention in order to achieve equivalent performance.

The present invention results in a large economic advantage with respect to conventional sequential processors, since the control is achieved by a combination of identical inexpensive microprocessors, each of which can be implemented as a high-volume production item. This is made possible by VLSI technology. Since there can be 64 or more microprocessors in such a structure, each can be reasonably slow. This makes a sophisticated cooling and power distributed network unnecessary, substantially reducing the control function costs. In the near future, VLSI technology can be expected to provide 1MIP (1 million instructions per second) microprocessors costing between $10.00 and $20.00 each, at high volume. Since a conventional sequential machine would have to be 64 times as fast in order to achieve equivalent performance, the cost comparison would be between a multi-microprocessor controller as described above, costing less than $200,000.00 (including cards, power supply, etc.) and a 64MIP sequential processor costing well in excess of $1,000,000.00.

It should also be noted that, although the primary purpose of interconnection between microprocessors and the array is the ability to consult a neighboring microprocessor to negotiate for space in case of overflows, this interconnection also permits individual element microprocessors to perform extensive local computations to guarantee correctness or to enhance performance without significantly degrading the response of the overall shared-memory unit. Indeed, a main advantage of this approach is that the availability of the shared storage unit is largely unaffected by ancillary processing required for recovery, journalling, lookhead cast-outs, or prefetching, etc. Note that the central processor is free to process additional requests from other application processors 110 immediately after forwarding, unless serialization is required (e.g., journalling of non-volatile permanent data). The local element microprocessor updates any status change to its assigned pages/segments, and performs any required data transfers using the common bus. This processing and transfer activity is asynchronous with respect to the central control processor, all application processors, and other element microprocessors.

We claim:

1. A data processing system of the type including at least one intelligent terminal, a memory for storing data and control means for performing at least one memory control function in accordance with data requests from said terminal, said control means comprising a plurality of microprocessors for performing said at least one memory control function in accordance with said data requests and interconnected in an array for communication between one another, each microprocessor performing its control function with respect to a respective area of said memory and a control processor responsive to a request for data from said at least one intelligent terminal for determining which one of said microprocessors is responsible for the requested data, and for forwarding said request for data to said one microprocessor.

2. A system as defined in claim 1, wherein each of said microprocessors comprises directory table means for maintaining a directory table of the data currently stored in its assigned area of said memory.

3. A system as defined in claim 1, wherein said memory comprises both a primary memory and a secondary memory with areas of said primary memory being assigned to respective ones of said plurality of microprocessors, and said control means further comprises a memory controller responsive to signals from said plurality of microprocessors for controlling transfer of data between said primary memory and secondary memory.

4. A system as defined in claim 1, wherein said memory includes at least first and second areas, wherein data can be accessed from said first area by said intelligent terminal without said data passing through said second area and wherein data can be accessed from said second area by said intelligent terminal without said data passing through said first area, and wherein said plurality of microprocessors includes at least a first microprocessor performing said at least one memory control function with respect to said first area and a second microprocessor performing said at least one memory control function with respect to said second area, said first and second microprocessors being interconnected in an array for communication between one another 5. A system as defined in claim 1, wherein said data requests from said at least one intelligent terminal identify requested data by a virtual address, with said control means performing virtual-to-real address translation and forwarding a real address of said requested data back to said intelligent terminal.

6. A data processing system of the type including at least one intelligent terminal, a memory for storing data and control means for performing at least one memory control function in accordance with data requests from said terminal, said control means comprising a plurality of microprocessors for performing said at least one memory control function in accordance with said data requests and interconnected in an array for communication between one another, each microprocessor normally performing its control function with respect to only a respective area of said memory, a control processor responsive to a request for data from said at least one intelligent terminal for determining which one of said microprocessors is responsible for the requested data, and for forwarding said request for data to said one microprocessor, and means for providing access by one of said microprocessors to at least a portion of the area in said memory which is normally controlled by another of said microprocessors.

7. A system as defined in claim 6, wherein said data requests from said at least one intelligent terminal identify requested data by a virtual address, with said control means performing virtual-to-real address translation and forwarding a real address of said requested data back to said intelligent terminal.

8. A data processing system of the type including at least one intelligent terminal, a memory for storing data and control means for performing at least one memory control function in accordance with data requests from said terminal, said control means comprising a plurality of microprocessors for performing said at least one memory control function in accordance with said data requests and interconnected in an array for communication between one another, each microprocessor performing its control function with respect to a respective area of said memory and a control processor responsive to a request for data from said at least one intelligent terminal for determining which one of said microprocessors is responsible for the requested data, and for forwarding said request for data to said one microprocessor.

9. A system as defined in claim 8, including at least first and second intelligent terminals, said control processor being responsive to data requests from each of said first and second intelligent terminals for determining which microprocessor is responsible for the requested data and for forwarding each request for data to the responsible microprocessor.

10. A system as defined in claim 8, wherein said data requests from said at least one intelligent terminal identify requested data by a virtual address, with said control means performing virtual-to-real address translation and forwarding a real address of said requested data back to said intelligent terminal.

11. A data processing system of the type including at least one intelligent terminal, a memory for storing data and control means for performing at least one memory control function in accordance with data requests from said terminal, said control means comprising a plurality of microprocessors for performing said at least one memory control function in accordance with said data requests and interconnected in an array for communication between one another, each microprocessor performing its control function with respect to a respective area of said memory and a control processor responsive to a request for data from said at least one intelligent terminal for broadcasting said request to a plurality of said microprocessors, whereby one of said microprocessors will respond to said broadcast data request.

12. A system as defined in claim 11, including at least first and second intelligent terminals, said control processor being responsive to data requests from each of said first and second intelligent terminals for broadcasting each request for data to said plurality of said microprocessors.

13. A system as defined in claim 11, wherein said data requests from said at least one intelligent terminal identify requested data by a virtual address, with said control means performing virtual-to-real address translation and forwarding a real address of said requested data back to said intelligent terminal.

14. A data processing system of the type including at least one intelligent terminal, a memory for storing data and control means for performing at least one memory control function in accordance with data requests from at least one of said terminals, said control means comprising a plurality of microprocessors for performing said at least one memory control function in accordance with said data requests and interconnected in an array for communication between one another, each microprocessor performing its control function with respect to a respective area of said memory and a control processor responsive to a request for data from said at least one intelligent terminal for determining which one of said microprocessors is responsible for the requested data, and for forwarding said request for data to said one microprocessor, said system further comprising switching means for selectively establishing connections between said intelligent terminals and said control means.

15. A system as defined in claim 14, wherein said switch means further selectively establishes connections between said intelligent terminals and said memory.

16. A system as defined in claim 14, wherein said data requests from said at least one intelligent terminal identify requested data by a virtual address, with said control means performing virtual-to-real address translation and forwarding a real address of said requested data back to said at least one intelligent terminal.

17. A data processing system of the type including at least one intelligent terminal, a memory for storing data and control means for performing at least one memory control function in accordance with data requests from at least one of said terminals, said control means comprising a plurality of microprocessors for performing said at least one memory control function in accordance with said data requests and interconnected in an array for communication between one another, each microprocessor performing its control function with respect to a respective area of said memory and each generating a control signal for controlling transfer of data to and from its respective area of said memory, said memory comprising both a primary and a secondary memory with areas of said primary memory being assigned to respective ones of said plurality of microprocessors, and said control means further comprising a control processor responsive to a request for data from at least one of said intelligent terminals for determining which one of said microprocessors is responsible for the requested data, and for forwarding said data request to said one microprocessor and for forwarding said control signals from said processors, and a memory controller responsive to said control signals from said plurality of microprocessors via said control processor for controlling transfer of data between said primary and secondary memories, said system further comprising switch means for selectively establishing connections between said intelligent terminals and said control processor.

18. A system as defined in claim 17, wherein said switch means further selectively establishes connections between said intelligent terminals and said primary memory.

19. A system as defined in claim 18, further comprising means for establishing connection for signals between said control processor and said memory controller without passing through said switch means.

20. A system as defined in claim 19, wherein said switch means further selectively establishes connection between said control processor and said memory controller.

21. A system as defined in claim 17, wherein said switch means further selectively establishes connection between said memory controller and said primary memory.

22. A system as defined in claim 17, wherein said data requests from said at least one intelligent terminal identify requested data by a virtual address, with said control means performing virtual-to-real address translation and forwarding a real address of said requested data back to said at least one intelligent terminal.

23. A data processing system of the type including at least one intelligent terminal, a memory for storing data and control means for performing at least one memory control function in accordance with data requests from said terminal, said control means comprising a plurality of microprocessors for performing said at least one memory control function in accordance with said data requests and interconnected in an array for communication between one another, each microprocessor normally performing its control function with respect to only a respective area of said memory, a control processor responsive to a request for data from said at least one intelligent terminal for broadcasting said request to a plurality of said microprocessors, whereby one of said microprocessors will respond to said broadcast data request, and means for providing access by one of said microprocessors to at least a portion of the area in said memory which is normally controlled by another of said microprocessors.

24. A data processing system of the type including at least one intelligent terminal, a memory for storing data and control means for performing at least one memory control function in accordance with data requests from at least one of said terminals, said control means comprising a plurality of microprocessors for performing said at least one memory control function in accordance with said data requests and interconnected in an array for communication between one another, each microprocessor performing its control function with respect to a respective area of said memory and a control processor responsive to a request for data from said at least one intelligent terminal for broadcasting said request to a plurality of said microprocessors, whereby one of said microprocessors will respond to said broadcast data request, said system further comprising switching means for selectively establishing connections between said intelligent terminals and said control means.

25. A data processing system of the type including at least one intelligent terminal, a memory for storing data and control means for performing at least one memory control function in accordance with data requests from at least one of said terminals, said control means comprising a plurality of microprocessors for performing said at least one memory control function in accordance with said data requests and interconnected in an array for communication between one another, each microprocessor performing its control function with respect to a respective area of said memory and each generating a control signal for controlling transfer of data to and from its respective area of said memory, said memory comprising both a primary and a secondary memory with areas of said primary memory being assigned to respective ones of said plurality of microprocessors, and said control means further comprising a control processor responsive to a request for data from at least one of said intelligent terminals for broadcasting said request to a plurality of said microprocessors, whereby one of said microprocessors will respond to said broadcast data request, and for forwarding said control signals from said processors, and a memory controller responsive to said control signals from said plurality of microprocessors via said control processor for controlling transfer of data between said primary and secondary memories, said system further comprising switch means for selectively establishing connections between said intelligent terminals and said control processor.

* * * * *